Figure 1:
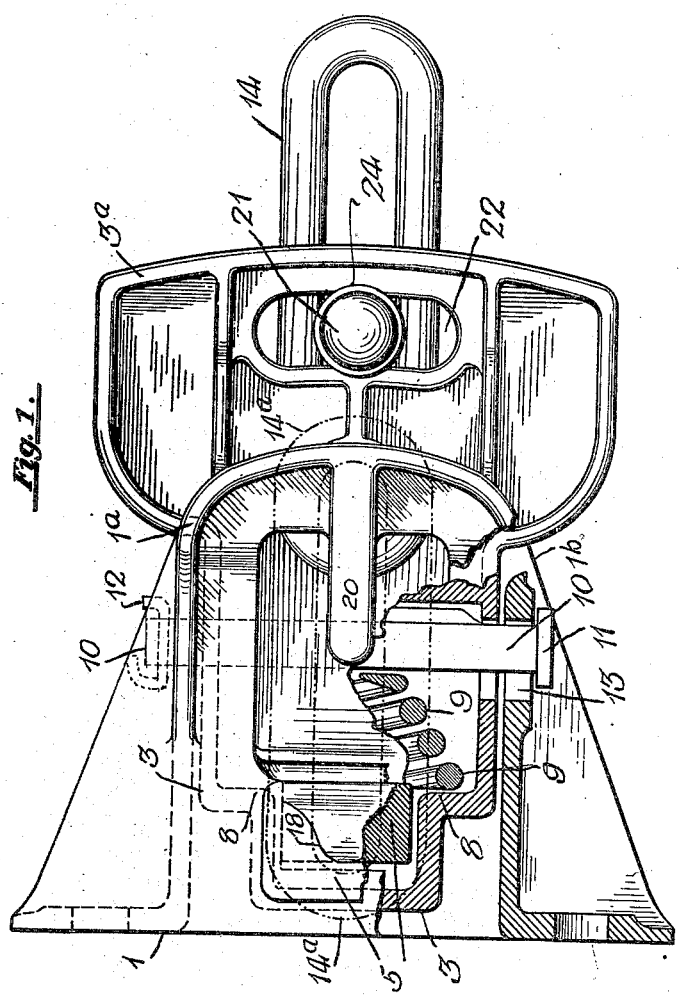

Nov. 22, 1927.

R. NASH 1,650,533

DRAW HEAD AND COUPLING LINK

Filed June 13, 1925 2 Sheets-Sheet 1

INVENTOR
Ralph Nash
BY
Mason Fenwick & Lawrence
ATTORNEY

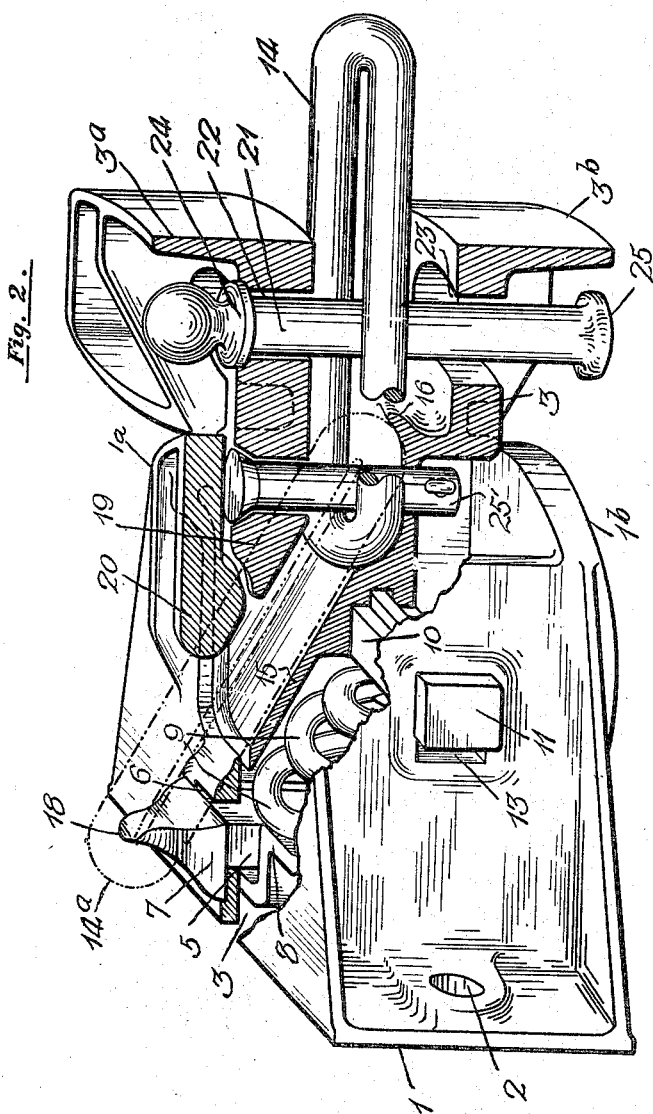

Patented Nov. 22, 1927.

1,650,533

UNITED STATES PATENT OFFICE.

RALPH NASH, OF SEATTLE, WASHINGTON, ASSIGNOR TO C. M. LOVSTED, DOING BUSINESS AS C. M. LOVSTED & CO., OF SEATTLE, WASHINGTON.

DRAWHEAD AND COUPLING LINK.

Application filed June 13, 1925. Serial No. 36,968.

This invention relates to drawheads and coupling links for freight cars, and particularly to drawheads with a recess for receiving and holding the link back of and above ordinary level of the link when attached between two cars.

The object of this invention is to provide a drawhead for light freight cars, with a link permanently carried therein for connecting with another drawhead on other cars, with an upwardly inclined recess back of the front jaws of the drawhead, into which recess the ordinary coupling link may be readily moved and there remain outside of space to be occupied by another coupling link from another adjoining drawhead, which may be used for coupling the two cars, with a guard above and below the recess to prevent the link therein from extending outward beyond the jaws other than in a horizontal position.

In the ordinary use of freight cars, the drawheads on each end thereof are provided with a coupling link, and when two cars are attached together, only one of the links is used and the other is to one side, and is frequently bent and impaired and cannot be used when needed for coupling with another car, the link of which may also have been injured, and in some islands of the Pacific where small freight cars are used for hauling sugar cane, the operatives cannot be relied upon to use care, and they also frequently remove parts of the steel from cars for their own purposes and it is one of the objects of this invention to provide means for holding the movable parts of the coupling apparatus so that they cannot be easily removed without special tools therefor.

A further object is to provide a drawhead with an inclined recess within which an unused coupling link is retained and so constructed that the link is easily released by slight manual lifting and will then automatically slide down into the desired position for coupling without danger to the operator, as he will not be obliged to hold the link.

In the accompanying drawings for illustrations:

Fig. 1, represents a top plan of the drawhead and link with parts broken away and, Fig. 2 represents a side elevation of the same, in perspective with parts broken away.

1 is a drawhead socket which is attached by bolts through holes 2 to the ends of a freight car, the front end of 1 has an upper jaw 1$^a$ and lower jaw 1$^B$, and between the jaws is adjustably assembled a drawhead 3, which also has an upper jaw 3$^a$ and lower jaw 3$^B$. The rear end of 3 extends back into the part 1 to near the base thereof, and the upper and lower walls of the part 1 has key ways 6, therethrough and a key pin 5 is positioned through the holes 6 and in front of the wall, and is held in such place by a head 7 at the top and a substantial cross pin, (not necessarily shown), through its lower end beneath the socket to prevent the pin being removed by trespassers. The walls of the adjoining part of 3 opposite the front side of the pin 5 have an angular bend and form bracket 8, and upon these rest the larger and rear end of a suitable buffer coil spring 9 in conical form. The front end of this spring rests against a substantial cross key 10 which holds the drawhead in its position in the socket 13. This key 10 is held in position through the socket at one end by a head, and prevented from being removed by trespassers, by a substantial cross key or bent pin 12, similar to that used in the lower end of the key 5. The passageway through the walls of 1 for key 10 are slotted whereby the key 10 is permitted to move backward and compress the spring when the front end of the drawhead is impacted by another car and thus the shock is received by the spring being compressed between the key 10 and key 5 as the bracket seats 8 are moved backward, when the drawhead is pulled forward, the spring again is a buffer. The foregoing features are distinguished from the ordinary construction by the conical spring only and which is so formed to permit of the sloping bed for the retired link 14.

The important feature of this invention is the retiring of the unused connecting link 14, and the holding of the same in retired position and the prevention of the link being injured by being bent down against the lower jaw 3$^b$ when cars meet together, and the facility given for placing the link in proper position when needed, also, to avoid accidents.

As each drawhead is provided with a link 14 and only one of the links is used for connecting two cars, it is desirable that the unused link be so disposed that it will be out of the way, and at the same time, be always ready for use when necessary. Attempts have been made to dispose of the extra link by causing the rear end thereof to drop downward and backward, but this is impracticable because the lower end is then in position to strike against track obstructions and cause wrecks or when necessary, to use the link, the operator must stoop down and reach under the couplings to push up the link to proper position for use, and be thereby endangered in case the cars are in motion, with other objections.

This construction provides a sloping, supporting bed 15 as a part of the drawhead frame, which terminates at the base with an upturned edge 16, thus forming a guard against which the lower end of the link is supported while it rests upon the bed 15. The link is shown in such position in dotted lines 14ª, with the regular permanent key 25' at all times in the same position in the link. The link is further held in such retired position by a lug 18, which projects therein from the top of the key 5. In order to prevent the outer end of the link from tipping downward and to hold the same in horizontal position, a rib member 19 is provided as a part of the drawhead which holds down the back end of the link, and the upturned edge 16 then acts as a fulcrum and support under the link and the link is thus held outward in horizontal position for easy connection within the adjoining drawhead of another car, and all danger of the outer end of the link being bent downward and over the jaw 3ᵇ and danger to operator obviated, as he need not hold the link. Rib 20 corresponding with 19 is carried by the socket member above 19 and extends back of the socket member forming a guard for holding down the rear end of the link 14 and thereby keeps the front end thereof elevated above the jaw 3ᵇ as the link slides down into position of the full lines shown in the drawings. These ribs 19 and 20 pass between the sides of the links, so that the rear end thereof may be raised off the lug 18 for the link to slide down from its retired position, but the ribs prevent the rear end of the links from later raising, and in connection with the fulcrum 16 prevents the front end of the link from lowering below the point desired between the jaws. The conical form of the spring 9 permits the use of the same beneath the sloping bed plate 15.

Each drawhead is provided with a link pin 21, for passing through and holding the extended end of a link 14 from the adjoining car, and passes down through a hole 22 in upper jaw 3ª and a larger hole in jaw 3ᵇ. A suitable head 24 holds the pin from dropping through the hole 22, and after the pin has been inserted therethrough the lower end of the pin is upset as 25 to prevent the same from being withdrawn entirely from the top hole 22, but the diameter of the lower hole 23 and the space between the sides of the link 14 is sufficient to permit the enlarged end 25 to freely pass through the same when necessary to couple the drawhead shown, with one upon another car. And when the link 14 in the drawings is used for connecting with such other car, then the pin 21 is normally in the position shown in such link. But when the link from the other car is used for the coupling, then the link 14 is retired to the position of the dotted lines 14ª and the pin 21 is passed through the link of the other car.

What I claim is:

1. A drawhead coupling link, with socket attached to a car with the drawhead adjustably held within the socket by keys and a conical spring between the keys for absorbing the shock of pushing and pulling the attached car, an inclined passageway leading back from front jaws of the drawhead and upward above the conical spring for receiving a coupling link while not used for connecting with another car, with an upturned ledge at the base of the incline, and ribs positioned centrally above the passageway for the purpose of holding down the rear end of the link while the front end thereof is upheld by the ledge the link thereby held in horizontal position when projected outward between the jaws of the drawhead, and held therein by a pin.

2. A drawhead and coupling link attached together with a pin removable only by use of special tools therefor, with an upper and lower jaw on the drawhead extending beyond the holding pin with a passageway between the jaws through which the free end of the link may be extended for connection with another drawhead, with another passageway extending back from and upwardly inclined from the said pin for receiving the said link, another coupling pin slidably adjusted in the outer end of the upper jaw with both ends of the pin enlarged to prevent removal therefrom without special tools therefor, with a recess in the lower jaw for receiving the lower end of the last mentioned pin and a space between the jaws for receiving the extended end of a link from another drawhead to be held by the said slidable pin.

In testimony whereof I affix my signature.

RALPH NASH.